No. 778,592. PATENTED DEC. 27, 1904.
J. W. LYTTON.
FEED WATER REGULATOR.
APPLICATION FILED AUG. 27, 1904.

3 SHEETS—SHEET 1.

Jarard W. Lytton, Inventor by Walter B. Burrow,
Attorney

Witnesses

No. 778,592. PATENTED DEC. 27, 1904.
J. W. LYTTON.
FEED WATER REGULATOR.
APPLICATION FILED AUG. 27, 1904.
3 SHEETS—SHEET 2.
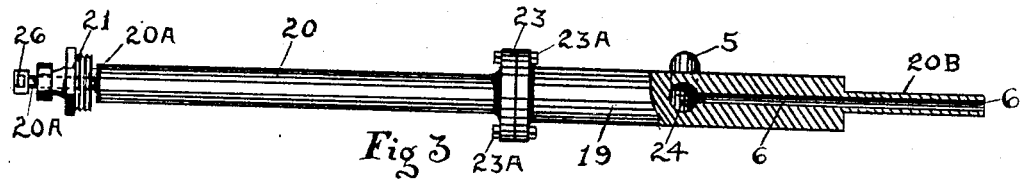
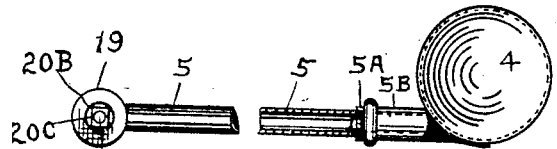
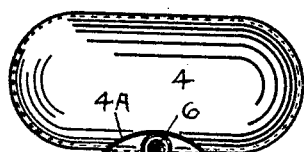
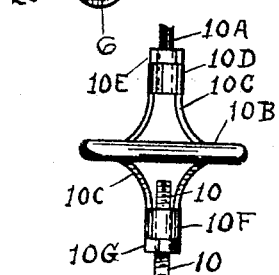
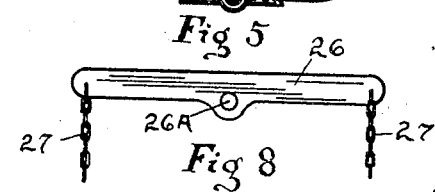
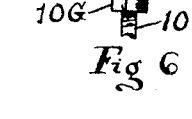
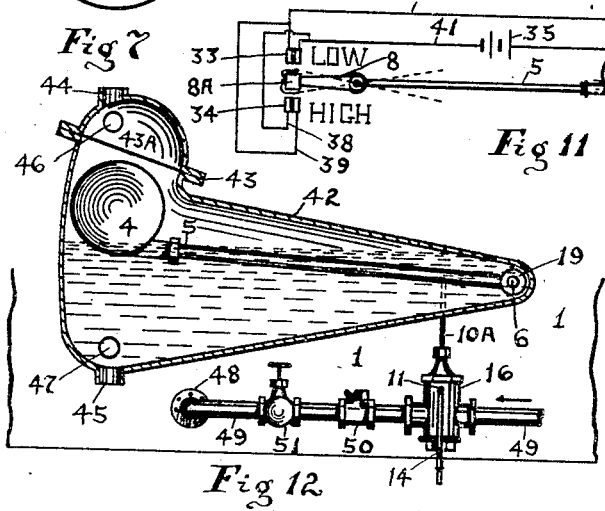
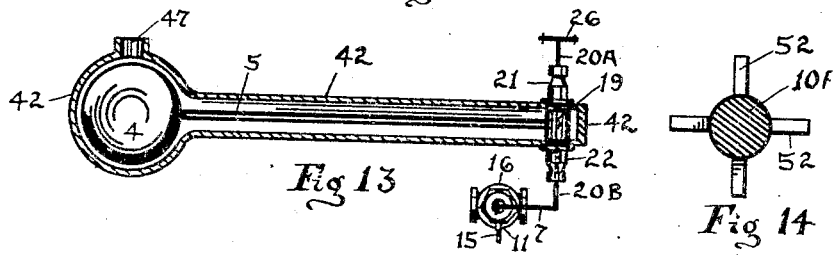
Jarard W. Lytton, Inventor
Witnesses
by Walter B. Burrow
Attorney Jarard W. Lytton. Inventor No. 778,592.

Patented December 27, 1904.

UNITED STATES PATENT OFFICE.

JARARD W. LYTTON, OF PORTSMOUTH, VIRGINIA.

FEED-WATER REGULATOR.

SPECIFICATION forming part of Letters Patent No. 778,592, dated December 27, 1904.

Application filed August 27, 1904. Serial No. 222,424.

*To all whom it may concern:*

Be it known that I, JARARD W. LYTTON, a citizen of the United States, residing at Portsmouth, in the county of Norfolk and State of Virginia, have invented new and useful Improvements in Feed-Water Regulators and Controllers, of which the following is a specification.

My invention relates to automatic feed-water regulators and controllers for steam-boilers.

The object of my invention is to provide means whereby the water-level in a boiler may be kept constant and to supply water as fast as evaporation takes place, and consequently to regulate the feed to the boiler.

A further object of my invention is to provide means for actuating the apparatus by hand for purposes to be fully described hereinafter.

With these and other objects in view the invention consists in certain constructions in feed-water controllers and regulators and certain combinations thereof, which will be hereinafter described and claimed.

Heretofore the complication of existing feed-water regulators has precluded their general use, as the delicate parts were difficult to keep in order and decidedly unreliable, as tests of their use will show. Therefore those upon the market have not been generally adopted, as they consist mainly or in part of springs, diaphragms, expansion-joints, ball-joints, and other mechanism, which in charge of persons exercising only ordinary care the proper working of the apparatus at all times is very doubtful. Float-actuated regulators have been equally unsatisfactory, because if the float should be attacked by acid matter or otherwise become corroded the float would be perforated, fill with water, and sink, in which case the pump would continue to force water into the boiler and soon fill it up entirely. In addition to the above objections no provision was made to ascertain the conditions of the mechanism within the boiler nor means by which they could be worked exterior to the boiler or generator.

In my invention I have provided every means calculated to render the apparatus absolutely reliable at all times. Therefore it will be well adapted both for land and marine service.

Figure 1:
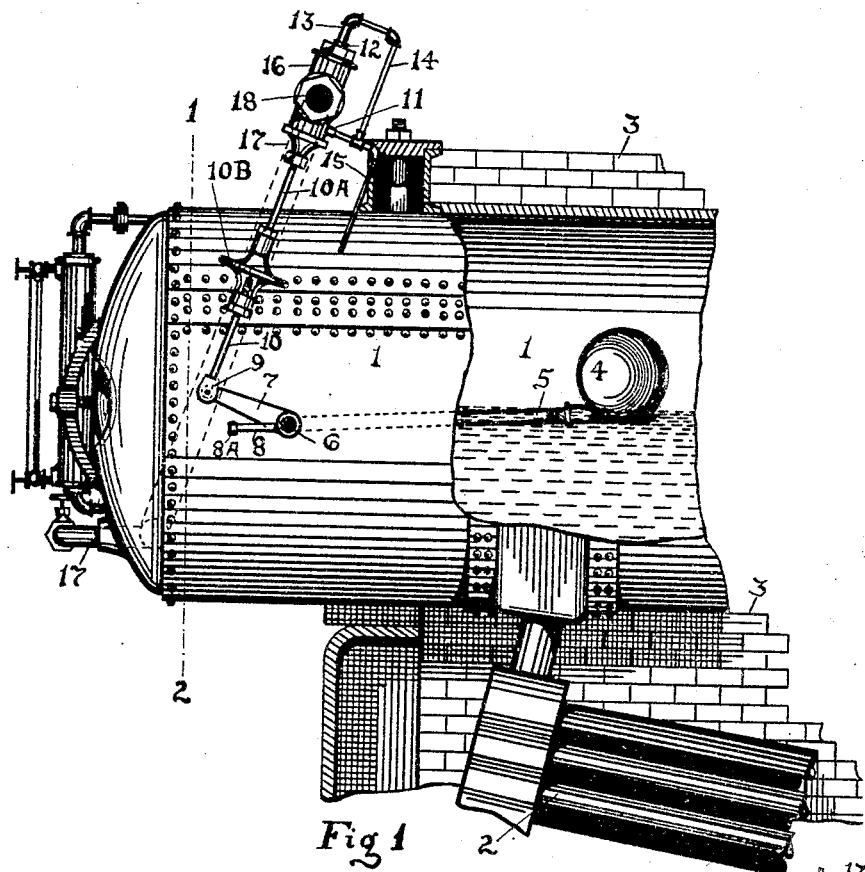
Figure 2:
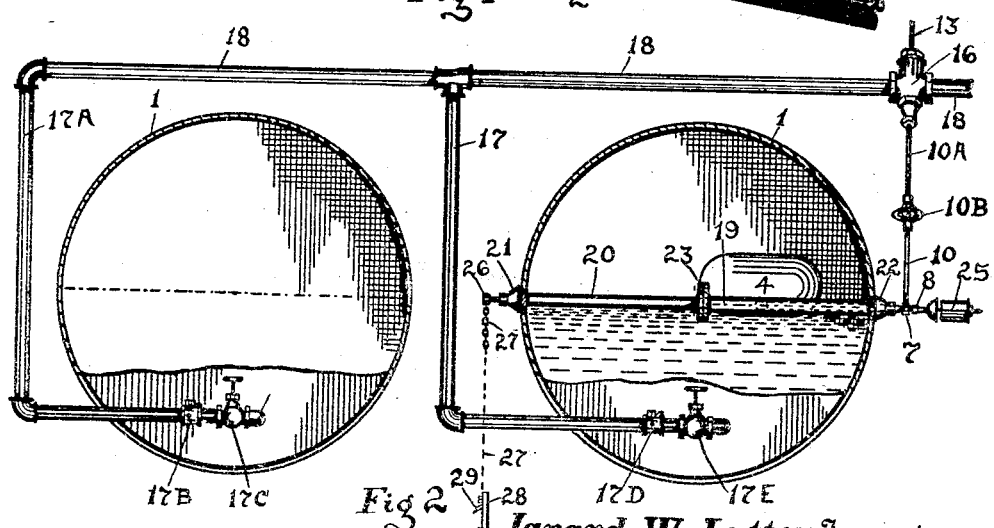
Figure 15:
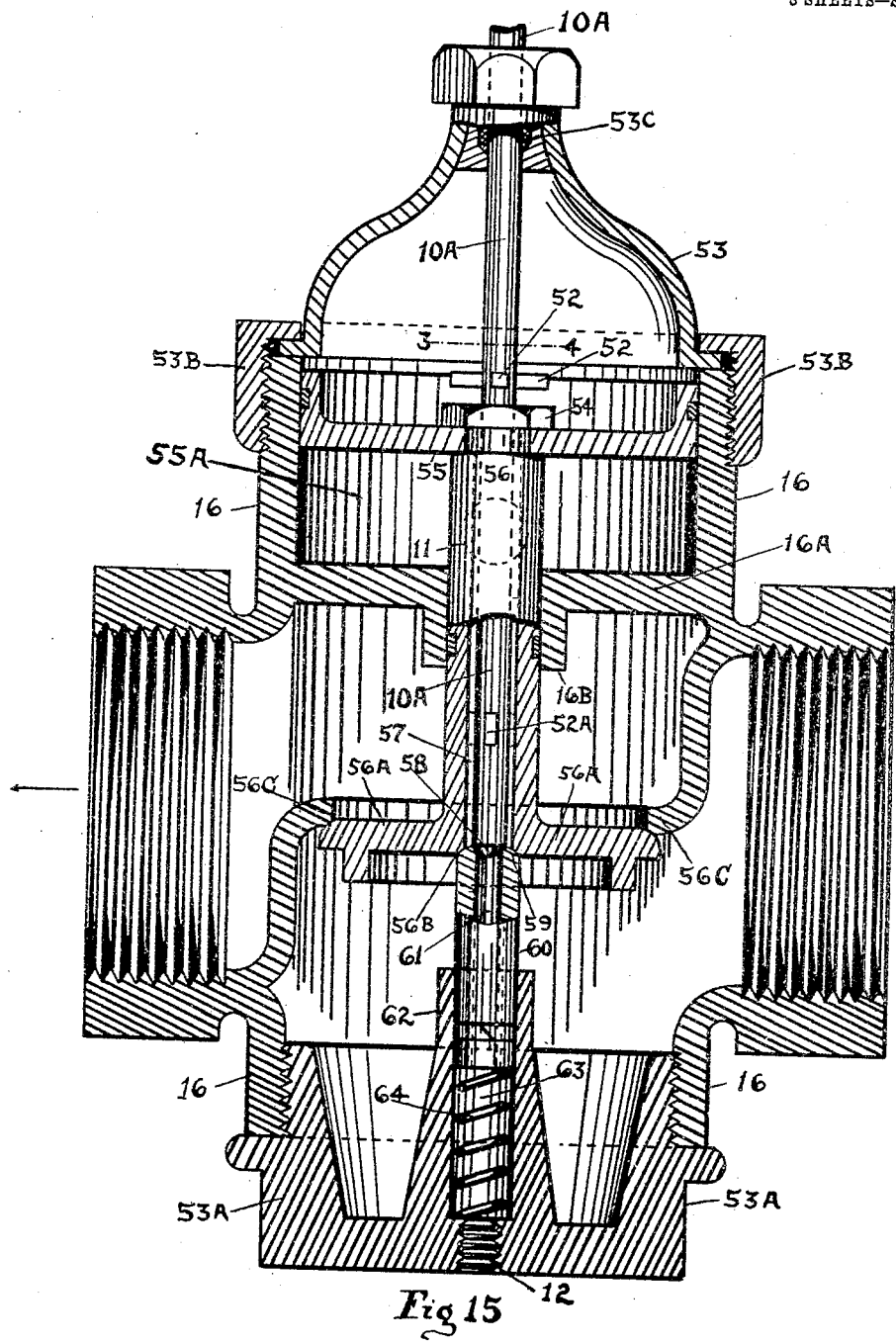

Referring to the drawings, Figure 1 is a part-sectional elevation of the upper part or drum of a water-tube boiler, showing the float and regulating-valve in position in the boiler. Fig. 2 is a cross-sectional elevation on the line 1 2 in Fig. 1. Fig. 3 is a part-sectional elevation of the float-shaft. Fig. 4 is an end elevation of the float and part-sectional elevation of the float-stem. Fig. 5 is a side elevation of the float. Fig. 6 is an elevation of the double-hub hand adjusting-wheel. Fig. 7 is a plan of the same. Fig. 8 is an elevation of the chain-operated or testing arm or lever. Fig. 9 is an end view of the spring contact-tongue. Fig. 10 is a side elevation of the same. Fig. 11 is a view of the float, electric contact-blocks, contact-tongue, and the arrangement of the electric circuits when it is desired to use such. Fig. 12 is a sectional elevation of an auxiliary exterior float-receptacle to be used in connection with boilers composed entirely of tubes or where it is desirable to have the float on the outside of the boiler. Fig. 13 is a sectional plan of the exterior receptacle. Fig. 14 is a sectional plan on the line 3 4 in Fig. 15. Fig. 15 is an elevation in section of the regulating-valve.

In the drawings in which like reference-numerals indicate similar parts in all the views, 1, Figs. 1 and 2, is the drum or shell of a water-tube boiler, though I am not confined to such, as my apparatus is equally adapted for many other types.

2 represents the tubes.

3 is the boiler brickwork or setting and upon which the boiler is supported.

4 is the float, of sheet metal, and has the form of a cylinder with semispherical or convex ends and is buoyantly supported upon the surface of the water within the boiler in normal working conditions, as will be fully described hereinafter.

5 is a hollow float stem or spindle.

5$^A$ is a half-union or other screwed device to enable the float to be disconnected from the stem 5.

5$^B$ is the float-socket, into which the stem 5 is secured therein.

6 is an outlet from the float interior and the stem 5 to the outside of the boiler or drum and will be more fully explained subsequently.

7 is an arm connected to the float-shaft 20, Fig. 2, for operating the regulating-valve 16.

8 is an auxiliary arm provided with a spring contact-tongue for closing an electric circuit in order to indicate the high or low water level, as will be hereinafter described.

$8^A$ is a block or head on the arm 8.

9 is a slotted head on the stem 10 for connection with the arm 7.

10 is the lower section of the valve-operating stem, the upper section being denoted by $10^A$. The two sections are united by a wheel $10^B$, having extended or converging spokes $10^C$ and is threaded in the hub portions $10^D$ and $10^F$ to fit corresponding screw-threads on the end of the stems 10 and $10^A$, thus providing for an adjustment in order to cause the float to operate the regulating-valve according to the height of water desired and may be as indicated by the dashes in Figs. 1, 2, and 12 or more or less, as may be deemed expedient. After adjustment the wheel $10^B$ is locked in the proper position upon the two ends of the spindle or rod by the nut $10^G$. The nut $10^E$ is fast to the hub $10^D$ and turns with the wheel.

11, Figs. 1, 12, and 15, is a side outlet to drain the chamber $55^A$, Fig. 15, of the main regulating-valve 16 in case any water should pass the piston 55 or the sleeve 56.

12 is a drain or drip opening for the bottom of the valve 16 and is placed in the plug $53^A$.

13, 14, and 15 are drip-pipes for removing the entrained water from the outlets 11 and 12 and are led to the ash-pit of the boiler or other convenient point.

16 is the main regulating-valve casing, Figs. 1, 2, 12, 13, and 15. In Figs. 1 and 2 the valve 16 is shown inverted, in which position it will work equally as well as that shown in Figs. 12, 13, and 15.

17 and $17^A$ are the branch feed-pipes to the boiler.

$17^B$ and $17^C$ are the left-hand drum check and stop valves, respectively, and $17^D$ and $17^E$ are those for the right-hand drum.

18 is the main feed-supply pipe from a pump or other suitable source, which passes through the regulating-valve 16 and thence to the branch feed-pipes 17 and $17^A$ to the boiler.

19 and 20 is the float-shaft, movably supported within the boiler and is in two detachable sections, secured together by the bolts $23^A$ passing through the flange and joint 23, Figs. 2 and 3. One of the sections 19 is hollow, as shown at 6, the opening extending to the exterior of the boiler shell or drum when in position therein and is usually of less diameter at its ends than the body portion 19 and 20, as at $20^B$, Fig. 3, so as to form spindle ends for fitting into the plugs and stuffing-boxes 21 and 22, or as shown in Fig. 3 at 21, thus forming a movable yet steam-tight joint or fulcrum. The passage or bore 6 connects with a diametrical opening or perforation 24 in the float-shaft, into which the float-stem 5 is fitted, as shown in Fig. 3. The aperture or channel 6 and 24, together with the pipe or hollow character of the spindle or stem 5, provides an outlet from the interior of the float 4 to the outside of the boiler shell or drum, as will be more fully described hereinafter. The section 20 of the float-shaft is usually solid, though I am not confined to such, as I may have both the sections 19 and 20 in the form of a pipe in cross-section or hollow or otherwise provided with a central passage like that shown in the section 19, as desired. The float-shaft section 20, as already described, has means provided so as to adapt it to fit into the plug and stuffing-box 22 by means of the spindle $20^B$. Both of the spindles $20^A$ and $20^B$ have square ends, as at $20^C$, Fig. 4, for conveniently attaching the levers 7, 8, and 26, though I may use round spindle ends, according to circumstances.

25, Fig. 2, is a whistle or other sound-making device and is connected to the float-shaft end $20^B$, Fig. 3, and in connection with the opening 6. The whistle forms an outlet means for the condensed water formed at certain periods within the float and its connecting members and also for the purpose of sounding an alarm if from any cause the float may become perforated, which would allow water to enter, and thus render the float inoperative. Should any steam enter the float from a puncture or perforation, it would immediately become manifest from the exterior of the boiler in time to either manually operate the mechanism or provide other means for feeding the boiler before any damage is done thereto. The two spindle ends of the float-shaft being of equal diameter are balanced, as the pressure does not act upon unequal surfaces.

26, Fig. 8, is an arm or lever provided with a central aperture $26^A$, which enables it to be fastened to the spindle end $20^A$ of the float-shaft section 20. The lever or arm 26 is provided with chains 27, fastened at each end thereof, so that the float and the other working parts may be actuated by hand from the outside of the boiler for the purpose of testing the working condition of the apparatus, as will be explained hereinafter.

28, Fig. 2, is a plate provided with a hook 29 for fastening the chain 27 upon to hold the float in a lowered position in order to fill the boiler above the normal steaming-level, as is the usual custom when fires are to be left banked over night or for any other purpose.

30 is a U-shaped or bifurcated metal spring-tongue secured to the insulating block or plate 31, Fig. 10, which is in turn fastened upon the block or head $8^A$ on the arm 8 by the screw 32 and is for the purpose of completing an electric circuit in order to ring a bell or other indicator according to the high and low water limits in the boiler.

33 is a metal block having interposed insulation, one side of the block being positive and the other negative and are in electrical circuit with the battery 35 and the bell or other similar device 36 by means of the wires 40 and 41. 34 is another insulated metal block, also connected to the battery 35 and the bell 36 by means of the wires 38 and 39.

37 is a switch to enable the bell to be cut out of circuit when necessary.

It is obvious that when the arm 8 rises the float is descending toward the low-water level. Consequently the tongue 30 will make a contact on both sides of the insulation of the block 33, which completes the circuit and rings the bell. When the water in the boiler rises or reaches the maximum high-water level, the arm 8 descends and makes a contact with the lower block 34 in the same manner and rings the bell. The arm 8 also indicates the water-level by sight if the location of the arm is such that it can be conveniently seen.

I am not confined to the exact arrangement shown in Fig. 11, as I may modify the parts to suit conditions.

42 is an auxiliary float reservoir or receptacle having a wedge shape in elevation and of a rectangular form with an approximate spherical enlargement at one end, as shown in Fig. 13, in order to provide for the passage of the float. The receptacle 42 is used when by reason of the construction of the boiler or steam-generator it is not practicable to place the float 4 inside of the boiler. The condition is met with in connection with boilers composed mostly of tubes or pipes or those having drums or shells of small diameter. The receptacle 42 is attached to the boiler by the connections 44 and 45 or those at 46 and 47, as is most convenient. In either case one of the openings at the top and bottom are suitably plugged.

In Fig. 13 I show the float in the form of a sphere, though the receptacle 42 is capable of containing a float like that shown in Fig. 5.

43 is a bonnet or cover on the receptacle 42 and forms a joint therewith, as at 43$^A$, for enabling the interior to be reached.

The receptacle 42 is connected up and operated in precisely the same manner as the boiler arrangement shown in Figs. 1 and 2 and is provided with the wheel 10$^B$, the arms 7, 8, and 26, and the whistle 25, though for the sake of clearness they are not shown in connection therewith.

48, Fig. 12, is a flange on the feed-pipe 49, which is in turn connected to the check-valve 50, stop-valve 51, and the main regulating-valve 16, through which passes the water-supply.

52 represents cross-bars or wings on the spindle or stem 10$^A$, Figs. 14 and 15, and are for the purpose of forcing the piston 55, Fig. 15, into a movable position. If from any cause it should become stuck or fast in the chamber 55$^A$, it may be readily disengaged therefrom by pulling on the chains 27, attached to the arm 26, which loosens it. At the same time the movement thus imparted also actuates the float, so that the whole mechanism can be tested and placed in working order. The lugs or wings 52 are normally out of contact with the piston 55 and nut 54 when automatically operated and by their form do not obstruct the passage of the pressure-exerting medium to the expansion-chamber by the channel or annular passage around the stem 10$^A$, as will be described hereinafter.

52$^A$, Fig. 15, represents guide-lugs for keeping the valve-stem 10$^A$ vertically in position.

53, Fig. 15, is the bonnet, provided with a stuffing-box and is secured to the valve-casing 16 by the clamp-nut 53$^B$.

53$^A$ is a sleeved plug screwed into the bottom of the valve-casing in which the drip or drain outlet 12 is located and will be more fully described hereinafter.

53$^C$ is packing in the stuffing-box in the bonnet 53, which renders the valve 16 steam-tight around the movable spindle or stem 10$^A$.

54 is a nut for securing the piston 55 to the valve-sleeve 56. The piston 55 is movable in the chamber 55$^A$ and is the means for causing motion to be imparted to the single puppet-valve 56$^A$ by the sleeve 56, which is concentric with and forms a rigid connection between the piston 55 and the valve 56$^A$. The piston is larger in diameter than the valve 56$^A$ in order to have more area to operate against the pressure beneath the valve.

56$^C$ is the seat for the valve 56$^A$ and is formed with the valve-casing 16, as shown.

57 is an annular passage or channel between the valve-stem 10$^A$ and the inner circumference of the sleeve 56 and leads from the axial or central seat 56$^B$ in the valve 56$^A$ to and above the piston 55 or in the interior of the bonnet 53.

58 is a tapered or cone-shaped end of the valve-stem 10$^A$ and is normally seated upon and closing the axial bore or passage 61 in the cylindrical valve 60, which is tapered or beveled to correspond to the seat 56$^B$, as at 59, and normally in contact with the valve 56$^A$. The cylindrical valve 60 is supported in the sleeve 62 integral with the plug 53$^A$ and rests upon the spring 64 in the cavity or bore 63, which holds it on the seat 56$^B$.

In addition to the description given I will describe my invention and the manner of operating the same.

As pointed out, the movement of the float 4 opens the valve 16 more or less to meet the demand for water in the boiler to supply that discharged as steam. The water-level may be kept constant or varied by adjusting the wheel 10ᴮ, which alters the period of opening and closing of the valve 16. The main regulating-valve mechanism operates when the stem or spindle 10ᴬ, Fig. 15, is depressed, which in turn depresses the valve 60, causing it to leave its seat 56ᴮ, and the pressure-exerting medium or fluid passes around the stem 10ᴬ, between it and the sleeve 56, through the annular passage 57 into the expansion-chamber above the piston 55, which descends and opens the valve 56ᴬ and starts the feed to the boiler. The movement of the stem 10ᴬ in normal working conditions is comparatively slight, though it may be operated to any extent within the limits of its stroke by means of the lever 26 and the chains 27, as already described.

The inlet and outlet of the valve-casing is indicated by the arrows in Fig. 15.

It will be noted that the stem 10ᴬ, the valve 56ᴬ, and the sleeve (integral with the valve) are separated from each other in their normal or inoperative condition. The plug 53ᴬ is removable and provides means for taking out and replacing the valve 56ᴬ, the valve 60, and the spring 63. When no influence is exerted upon the piston 55, the valve 56ᴬ is kept closed by the pressure at the inlet of the valve-casing, as indicated by the arrow at the right of Fig. 15.

The float 4, as shown and already described, is cylindrical with rounded or semispherical ends placed transversely to the axis of the stem 5, Figs. 4 and 5, and this form offers more buoyant surface and a steadier operation than if a float were used having the form of a ball or sphere.

I am not confined to the details of construction herein described and shown, as I may modify the several parts of my invention to suit conditions met with in practice without departing from the spirit of the matter herein claimed.

Having described my invention, what I claim, and desire to secure by Letters Patent, is—

1. In an automatic liquid-level regulating and controlling apparatus, the combination with a spherical-ended cylindrical closed sheet-metal float having a socket or bushing connected at a tangent thereon, a hollow stem or pipe secured to the said float and in the socket thereof, a hollow shaft or spindle transversely disposed to and attached to the said stem and adapted to allow the float to oscillate and respond to changes in the liquid-level, as described.

2. In combination with a boiler or steam-generator, of a steam drum or reservoir, an automatic water-level regulating and controlling apparatus comprising a cylindrical convex-ended fluid-actuated hollow float, a hollow pipe or stem connected thereto, a hollow shaft attached at right angles to the said stem and movably supported in the said steam-drum or boiler and adapted to effect a communication therethrough, from the interior of the float to the exterior of the boiler or drum; as described.

3. In a feed-water regulator, the combination of a boiler or steam-generator, a steam-drum or water-receptacle, of an automatic feed-controlling apparatus comprising a cylindrical spherical-ended water-level-actuated hollow float, a hollow supporting stem or pipe connected therewith on a tangent, a shaft or spindle-ended rod transversely connected to the said float pipe or stem, the said shaft composed of a solid flanged section and a hollow flanged section, the said flanged sections being removably united and transversely disposed in a movably-steam-tight position within the said boiler or steam-drum, the said hollow shaft-section adapted to provide a passage from the interior of the float to the exterior of the boiler; as described.

4. In a feed-water regulator and indicator, the combination with a steam-boiler, a drum with a steam and water space therein, of an automatic water-level controller comprising a hollow cylindrical closed float buoyantly supported in the said water-space, a hollow stem or spindle removably attached thereon by a union or screwed joint, a rocking partly-hollow shaft secured to the said stem and forming a passage to the interior of the float, a series of plugs and stuffing-boxes for movably steam-tight supporting the said shaft within the boiler, the said shaft adapted to allow the ends of the shaft to protrude outside of the boiler or drum, means for effecting a discharge of steam and vapor through the said protruding ends to the atmosphere when the float becomes perforated, a centrally-fulcrumed lever or arm on the opposite end of the said float-shaft for manually actuating the said shaft and the float, a chain at each end of the centrally-fulcrumed lever for actuating the same at a distance therefrom, and means for securing the said chains on a hooked plate for holding the float and its members at any angle within and without the boiler or drum independent of the water or liquid level; as described.

5. In a feed-water regulator and controller for steam-boilers and the like, the combination with a boiler and its steam and water drum or shell, of a controlled feed-water-supply mechanism comprising a regulating-valve, a hollow closed float, a hollow stem or pipe connected thereto, a rotary movable sectionally-united hollow shaft or pipe for supporting the said float and stem, a set of insertible screwed plugs forming stuffing-boxes therewith for rockably supporting the said shaft within the boiler or shell, a spindle on each end of the said sectional hollow shaft and extending or projecting outside of the boiler or shell, one of the said spindles or projections being hollow and adapted to form a passage with that in the shaft and float-stem to the interior of the imperforate inclosed float, an arm or lever on one end of the said hollow float-shaft and outside of the boiler shell or drum having motion coincident with that of the float, a centrally-divided screwed end-valve-operating spindle or rod for connection with one section of the said rod, the other end thereof forming the stem of the said regulating-valve, a hand adjusting or regulating wheel having double separated hubs or centers and convergent spokes axially extending outward from both sides of the rim or periphery and joining the said hubs, the said hubs being tapped for connection with the screwed ends of the divided or separable valve-operating spindle or rod, means for adjusting the float-stroke and the working level of the water in the boiler by the said hand-wheel, means for effecting a communication from the said inclosed hollow float interior to the atmosphere through the float-shaft.

6. In automatic water-level controlling and feed-regulator comprising a buoyantly-supported water-level-actuated hollow float, a hollow stem therefor, a rockable stem-supporting hollow shaft adapted to maintain a constant communication with the interior of the float to the exterior of the float-receptacle, a spindle on each end of the said float-shaft and extending on the outside of the walls of the receptacle, one or more of the said spindles being hollow and connected with the channel leading to the float interior, a valve-operating arm on the end of one of the spindles, a divided screw-end regulating-valve operating-rod, a double hub-screwed adjusting-wheel having axially-extending spokes and adapted to join and connect the divided valve-operating rod or spindle and to adjust the distance between the divided portions of the said rod, nut or screw locking means for securing the adjustment of the said rod and the wheel thereon, means for draining the float interior from the outside of the float-receptacle, means for causing a discharge of steam and vapor when the float becomes perforated or inoperative, and means for manually operating the described mechanism from the exterior of the receptacle; as described.

7. In a boiler feed-water-regulating and automatic controlling apparatus the combination with a float, a hollow float-stem, a hollow float-shaft attached and transversely disposed thereto and movably secured inside of the boiler and extending partly outside thereof, an arm on one end of the said shaft, of an automatic regulating-valve connected to the said arm comprising a valve-casing having inlet and outlet connection, a steam-tight bonnet therefor, an expansion-chamber beneath the said bonnet, a fixed separator plate or disk formed with the valve-casing and constituting the said expansion-chamber with the bonnet, a depending sleeve or bushing on the said separator plate or disk, a piston or plunger movably inclosed in the said expansion-chamber, a sleeve or cylinder secured to and moving with the said piston, a main single puppet feed-valve integral with the said sleeve, a spindle or stem passing through and forming an annular passage around thereof, a tapered or cone end on the said stem or spindle, a hollow spring-pressed cylindrical valve normally seated on the said puppet-valve and closing the said annular passage or channel, the hollow or bore of the said cylindrical valve being normally closed by the cone end of the valve-stem or spindle, means for causing the pressure-exerting fluid to enter through the said cylindrical valve and around the spindle into the expansion-chamber above the piston when the said stem or spindle is depressed, and means for operating the said stem, piston, cylindrical valve and the puppet-valve independently of the pressure-exerting medium; as described.

8. In an automatic feed-water regulator and controller comprising among its elements a regulating-valve, of a valve-casing having inlet and outlet connection, a main tapered valve-seat formed with the said casing, a screwed detachable sleeved plug secured thereto at the bottom thereof, a bonnet movably attached to the said valve-casing, a separator plate or web integral with the valve-casing, an expansion-chamber formed by the said partition or web and the bonnet, a piston movably operative in the said expansion-chamber, a sleeved tapered edge puppet-valve screw fastened to the said piston and working therewith, a sleeve or bushing on the said separator plate or web for guiding the sleeved puppet-valve therethrough, an externally-operated valve stem or spindle passing steam-tight through the said bonnet, a series of radially-disposed bars or wings thereon and adapted to come in contact with and depress the piston when manually operated but normally clear of the piston when automatically actuated by the pressure-exerting fluid, the said stem working within the sleeve of the puppet-valve and axially therethrough and forming an annular channel around the stem, a hollow cylindrical tapered or bevel-ended spring-pressed valve having an axial elongated bore and adapted to normally close the channel around the said stem and in the sleeve, means for closing the bore of the said cylindrical valve with the valve-stem, a spring in the said sleeved plug and under the cylindrical valve, means for operating the puppet-valve by actuating the said stem and cylindrical valve to admit pressure into the annular passage around the stem to the expansion-chamber and above the piston, and means for operating the said puppet-valve independent of the pressure-exerting medium thereon; as described.

9. In a feed-water controller the combination with a steam boiler or generator, of a float buoyantly supported therein, a hollow float-stem, a transversely-disposed shaft therefor, a feed-water-regulating valve connected to the said float, of an exteriorly-placed auxiliary float reservoir or receptacle having a wedge-shape form in elevation thereof and a rectangular form with a curved enlargement at one end in sectional plan, the said enlargement adapted to accommodate the float therein, the said receptacle having a plurality of inlets and outlets connected to the boiler at different heights, a removable semispherical cap or cover on the said receptacle, means for manually operating the float therein, means for extending the said float-shaft steam-tight to the exterior of the receptacle, means for adjusting the water-level and the float within the receptacle and means for causing a communication from the interior of the float to the exterior of the receptacle; as described.

In testimony whereof I have hereunto affixed my signature in the presence of two witnesses.

JARARD W. LYTTON.

Witnesses:
 JOB P. MANNING,
 JOHN C. SANDS.